United States Patent
Perego et al.

(10) Patent No.: US 8,581,014 B2
(45) Date of Patent: Nov. 12, 2013

(54) PROCESS FOR THE PRODUCTION OF HYDROCARBONS, USEFUL FOR MOTOR VEHICLES, FROM MIXTURES OF A BIOLOGICAL ORIGIN

(75) Inventors: Carlo Perego, Carnate (IT); Franco Baldiraghi, Melegnano (IT); Suheil Fares Abdo, Des Plaines, IL (US); Terry Louise Marker, Des Plaines, IL (US); Luigina Maria Flora Sabatino, Milan (IT)

(73) Assignees: ENI S.p.A., Rome (IT); UOP LLC, Des Plaines, IL (US)

( * ) Notice: Subject to any disclaimer, the term of this patent is extended or adjusted under 35 U.S.C. 154(b) by 859 days.

(21) Appl. No.: 12/637,232

(22) Filed: Dec. 14, 2009

(65) Prior Publication Data

US 2010/0160698 A1   Jun. 24, 2010

(30) Foreign Application Priority Data

Dec. 12, 2008   (IT) ............................... MI2008A2214

(51) Int. Cl.
*C07C 1/00* (2006.01)
*C10G 1/10* (2006.01)

(52) U.S. Cl.
USPC ............. 585/240; 585/242; 44/605; 502/238; 502/439

(58) Field of Classification Search
USPC ............. 585/240, 242, 733; 44/605; 502/238, 502/261, 439
See application file for complete search history.

(56) References Cited

U.S. PATENT DOCUMENTS

| | | | | |
|---|---|---|---|---|
| 7,740,821 B2* | 6/2010 | Watkins et al. | ............... | 423/326 |
| 7,880,049 B2* | 2/2011 | Dumesic et al. | ............... | 585/733 |
| 8,075,642 B2* | 12/2011 | Dumesic et al. | ............... | 44/308 |
| 2009/0300970 A1 | 12/2009 | Perego et al. | | |
| 2011/0239532 A1* | 10/2011 | Baldiraghi et al. | ............. | 44/388 |

FOREIGN PATENT DOCUMENTS

| | | |
|---|---|---|
| EP | 0 748 652 A1 | 12/1996 |
| EP | 1 728 844 A1 | 12/2006 |
| WO | WO0007710 * | 2/2000 |
| WO | 2005/002726 A1 | 1/2005 |
| WO | 2008/058664 A1 | 5/2008 |
| WO | 2008/058664 A8 | 5/2008 |

OTHER PUBLICATIONS

Extended European Search Report issued Dec. 7, 2010, in European Patent Application No. 09178651.7.

\* cited by examiner

*Primary Examiner* — Nina Bhat
(74) *Attorney, Agent, or Firm* — Oblon, Spivak, McClelland, Maier & Neustadt, L.L.P.

(57) ABSTRACT

Provided is a process for producing, in a single step, hydrocarbon fractions useful as diesel fuel or as a component of diesel fuel, from a mixture of a biological origin containing esters of fatty acids and, optionally, aliquots of free fatty acids. The process comprises the contemporaneous hydrodeoxygenation and hydroisomerization of the mixture of a biological origin, with the formation of linear and branched paraffins. The process is carried out in the presence of a catalytic composition comprising an amorphous carrier of an acidic nature and a metallic component containing one or more metals of group VIII.

62 Claims, 2 Drawing Sheets

PROCESS FOR THE PRODUCTION OF HYDROCARBONS, USEFUL FOR MOTOR VEHICLES, FROM MIXTURES OF A BIOLOGICAL ORIGIN

Figure 1:
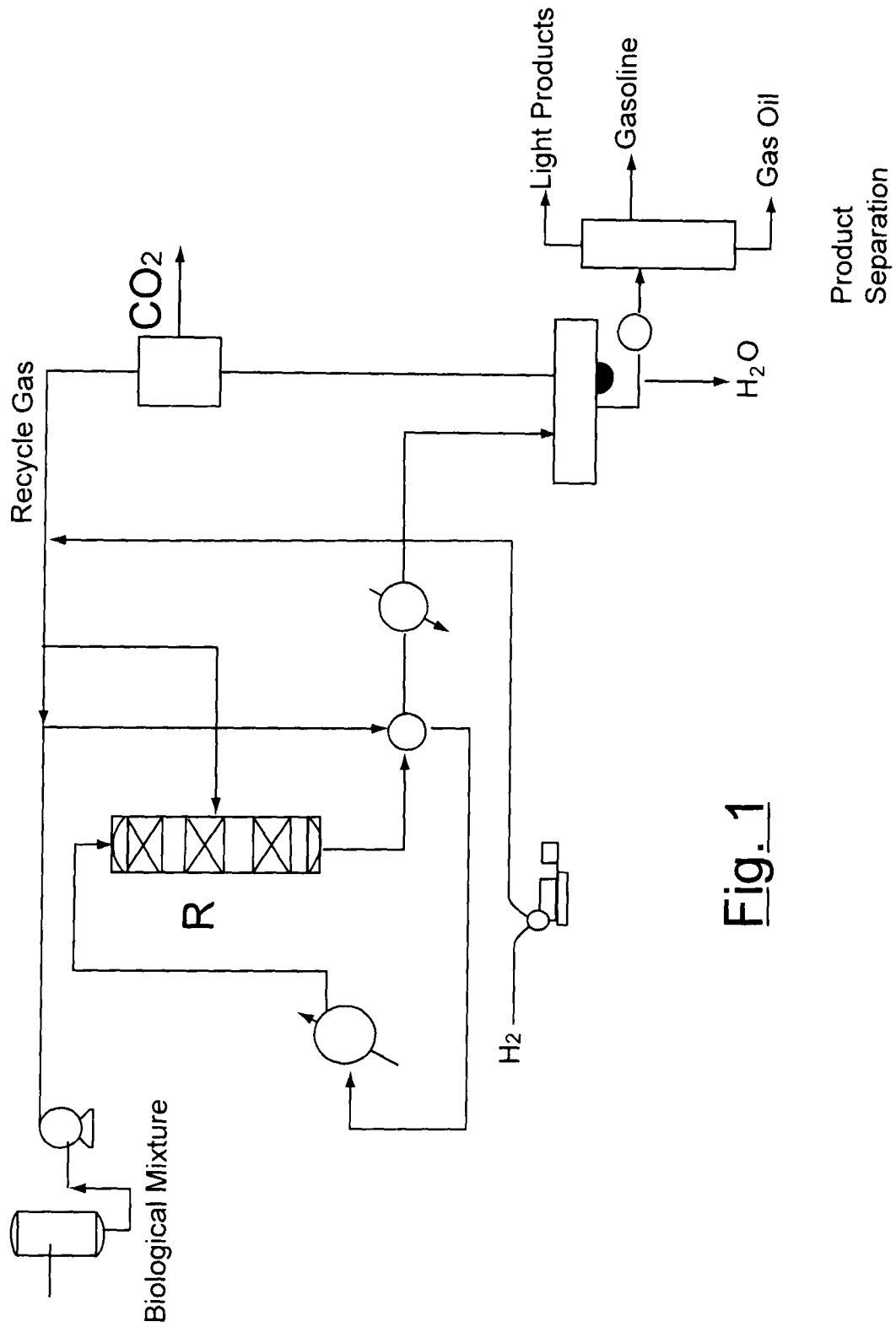
FIG. 1 Plant scheme for producing hydrocarbons fraction used as fuel.

The present invention relates to the production, through a one-step process, of hydrocarbon fractions useful as diesel fuel or components of diesel fuel, starting from a blend of a biological origin containing esters of fatty acids, possibly with aliquots of free fatty acids. During this process, the contemporaneous deoxygenation and hydroisomerization is obtained of the biological mixture with the formation of hydrocarbons useful as fuel. The use of vegetable oils in diesel engines goes back to Rudolf Diesel, who, in 1900, demonstrated the capacity of diesel engine to run with peanut oil. During the second world war, both palm oil and peanut oil were used in Africa, as fuel for military vehicles. After the war, technological development led to an almost exclusive use of fuels deriving from petroleum; in addition, diesel engines were enormously improved, mainly with respect to the injectors and control systems, to such an extent that there was little flexibility for the use of fuels different from gas oil. At the same time, vegetable fuels were progressively abandoned due to the high production cost and inconstancy in the product quality.

During the oil crisis of the seventies', attention was refocused on the use of vegetable oils as diesel fuels, but this was difficult for various reasons (formation of crusting in the internal combustion engine, blockage of the injectors, dilution of the lubricant). Research activities were therefore directed towards the preparation, starting from vegetable oils, of methyl or ethyl esters and their use in diesel engines. Methyl and ethyl esters of fatty acids are obtained from vegetable oils by transesterification with methanol or ethanol. An alternative approach for the conversion of vegetable oils was proposed in the eighties' and consists in the forced hydrogenation of these to produce hydrocarbon fractions with a boiling point compatible with diesel fuels obtained from oil. The forced hydrogenation of vegetable oils causes the removal of oxygen with the contemporaneous formation of a mixture of $H_2O$, $CO_2$ and CO, in reciprocal ratios varying according to the operative conditions. The starting ester is thus prevalently transformed into hydrocarbons with respect to both the fatty acids and glycerin. Small amounts of free alcohols can be formed together with the hydrocarbons.

The forced hydrogenation reaction of fatty oils to produce liquid fuels was studied for example, still in the eighties', by Nunes et al., who, in the article entitled "Hydrocraquage sous pression d'une huile de soja: procédé d'étude et allure générale de la transformation" (Rev. Inst. Fr. Pet. Of 1986, vol. 41, page 421 onwards) describe the hydrocracking of soybean oil with a bifunctional catalyst. At a temperature higher than 673 K, decarbonylation and decarboxylation of the fatty acids are observed, together with a distinct hydrogenolysis due to the presence of the metallic catalyst. The main products are linear-chain hydrocarbons.

J. Gusmao et al. (Utilization of vegetable oils as an alternative source for diesel-type fuel: hydrocracking on reduced Ni/$SiO_2$ and sulphided Ni—Mo/$Al_2O_3$, Catalysis Today 5 of 1989 page 533 onwards) demonstrates how, in the hydrogenation of soybean oil, the hydrocarbon fraction obtained mainly consists of linear paraffins (96% molar of $C_{15}$-$C_{16}$-$C_{17}$-$C_{18}$).

U.S. Pat. No. 4,992,605 describes a process for producing hydrocarbon fractions in the $C_{15}$-$C_{18}$ range by the hydrogenation of vegetable oils such as sunflower oil, rape oil, canola oil, palm oil, or fatty oils contained in the pulp of pine trees (tall oil). This hydrocarbon fraction prevalently consists of linear paraffins ($C_{15}$-$C_{18}$) and is characterized by a high cetane number, which is such that it can be used as a cetane improver.

In "Hydroprocessed vegetable oils for diesel fuel improvement", Bioresources Technology 56 (1996), pages 13 to 18, the application described in U.S. Pat. No. 4,992,605 is summarized, on a laboratory scale to produce a hydrogenated product starting from canola oil. The hydrocarbon fraction almost exclusively consists of linear paraffins and the fraction which distills within the distillation range of diesel fuel, has a cetane number ranging from 55 to 90. Other hydrogenation products include light $C_1$-$C_5$ hydrocarbons, water and $CO_2$. The diesel fraction is defined "super cetane". The density (0.790 g/ml) is compatible with diesel fuel, whereas the viscosity is slightly higher. The real limit of this fraction however is linked to the poor low-temperature properties (cloud and pour points) associated with the linearity of paraffins, which exceed 20° C. For this reason, the "super cetane" fraction can be used in a mixture with conventional diesel but not during the winter months.

EP 1396531 describes a process for the production of hydrocarbon components from mixtures of a vegetable or animal origin. The formation of a mixture with a content of iso-paraffins of 73%, is described. The process comprises a pre-hydrogenation step, a hydrodeoxygenation step (HDO) and an isomerization step which operates using the counter-current flow principle. The pre-hydrogenation step, which is carried out under bland conditions, is necessary for saturating the double bonds present and avoiding undesired side-reactions in the subsequent process steps. In the isomerization steps it is absolutely indispensable to operate in countercurrent to protect the catalyst from deactivation caused by the water contained in the feeding deriving from the previous HDO step: when operating in countercurrent, part of the water contained in the hydrocarbon feeding is removed, before said feeding comes into contact with the whole catalyst of the catalytic bed.

WO 2008/058664 describes a process for the production of hydrocarbon fractions from blends of a biological origin. The process comprises a hydrodeoxygenation step and a hydroisomerization step, the latter carried out in the presence of a catalytic system comprising:

a) a carrier of an acid nature comprising a completely amorphous micro-mesoporous silico-alumina having an $SiO_2/Al_2O_3$ molar ratio ranging from 30 to 500, a surface area greater than 500 m²/g, a pore volume ranging from 0.3 to 1.3 ml/g, an average pore diameter lower than 40 Å, b) a metal component containing one or more metals of group VIII, possibly mixed with one or more metals of group VIB.

US 2007/0135669 describes a process for obtaining branched paraffins, which can be used as diesel, from vegetable oils or animal fats. Fatty acids or esters of fatty acids obtained with light alcohols are transformed into branched fatty acids or into branched esters of fatty acids. Branched hydrocarbons are obtained from these non-linear oxygenated compounds through decarboxylation/decarbonylation or hydrodeoxygenation. The skeleton isomerization product, when unsaturations are present in the feed, contains cyclic acids and polymeric species of esters of fatty acids, as by-products. The process therefore requires a distillation to separate the dimers from the branched compounds, a pre-hydrogenation step in order to saturate the multiple bonds and extraction with a solvent to separate the branched compounds from the linear compounds. A deoxygenation step follows the isomerization and purification steps. The deoxygenation can be effected by decarbonylation/decarboxylation or by hydrodeoxygenation.

The decarbonylation/decarboxylation step can also be carried out without hydrogen. The process therefore consists in the following series of steps: (i) preparation of the fatty acids or esters of fatty acids from substances of an animal or vegetable origin; (ii) hydrogenation to saturate the multiple bonds, (iii) skeleton isomerization, (iv) separation of the isomers, (v) removal of the oxygen to obtain the product useful as diesel.

It is evident that the processes described in the prior art have a high degree of complexity and the necessity is therefore felt for finding a process which allows natural products to be transformed, in a simple way, into products which can be used as fuels.

US 2006/0207166 describes a process for the production of fuels from oils of a vegetable and/or animal origin which comprises the hydrodeoxygenation and hydroisomerization of the oil in a single step. This process uses a catalyst comprising an acid component and a metallic component. The metal is preferably Pt or Pd, whereas the acid is selected from amorphous silico-aluminas, fluorinated alumina, ZSM-12, ZSM-21, ZSM-22, ZSM-23, ZSM-35, ZSM-38, ZSM-48, ZSM-57, SSZ-32, ferrierite, SAPO-11, SAPO-31, SAPO-41, MAPO-11, MAPO-31, Y zeolite, L zeolite, beta zeolite. From the examples, it is evident that the process leads to the formation of a high quantity of undesired by-products corresponding to aromatic compounds and heavy products. In particular, in the best example provided, in terms of isoparaffin/normal-paraffin ratio and in terms of cloud point, obtained at 390° C. (Table 5, Example 3C of US 2006/0207166), a high percentage of alkylbenzenes is formed (15% by weight) together with a weight percentage of 5.3% of non-specified compounds, probably heaving compounds corresponding to bi-, tri- and poly-aromatic compounds.

A process has now been found for the production of a hydrocarbon mixture which can be used as diesel fuel or as a component for gas oil by means of the thermal treatment, in a hydrogen atmosphere (hydrotreatment), in the presence of a suitable catalyst, of a mixture of a biological origin containing esters of fatty acids with possibly aliquots of free fatty acids, such as for example vegetable oils for example, such as sunflower, rape, canola, palm oils, or fatty oils contained in the pulp of pine trees (tall oil). This hydrotreatment allows hydrocarbon mixtures to be obtained, in which the content of isoparaffins can exceed 80%, the remaining part being n-paraffins.

The particular catalytic compositions which are used in this hydrotreatment process not only allow a high-quality product to be obtained, comparable to the best diesel fuels obtained with the known processes, but they also have characteristics which allow them to be used in the presence of water without undergoing deactivation or in any case to be easily regenerated during the hydrotreatment itself by means of a moderate temperature rise.

The catalytic compositions used in the present invention allow, with respect to what can be obtained with the processes of the prior art, also when effected in a single step, the formation of undesired by-products, in particular aromatic compounds, to be minimized and rendered insignificant. Furthermore, this result is reached by operating at lower process temperatures with the other conditions remaining unaltered.

An object of the present invention therefore relates to the process for producing a hydrocarbon fraction to be used as diesel fuel or as a component of diesel fuel, from a mixture of biological origin containing esters of fatty acids, and possibly also containing free fatty acids, comprising hydrotreating the mixture of biological origin in the presence of a catalytic composition comprising:

A) an amorphous support of acidic nature, chosen between:

(1) an amorphous silica-alumina having a $SiO_2/Al_2O_3$ molar ratio greater or equal to 5, (2) a porous solid material comprising silicon, aluminum, phosphorus and oxygen bonded together so as to form an amorphous mixed oxide constituting a single phase, characterised by a Si/Al atomic ratio comprised between 15 and 250, a P/Al ratio of at least 0.1, but lower than 5, preferably comprised between 0.3 and 3.5, a total pore volume comprised between 0.5 and 2.0 ml/g, an average pore diameter comprised between 3 nm and 40 nm and a specific surface area between 200 and 1,000, preferably between 300 and 900 $m^2/g$;

B) a metallic component containing one or more metals of the group VIII, possibly in admixture with one or more metals of group VIB, with the proviso that the catalytic composition, if formed by a silica-alumina of (1) type and Pt, is pretreated with a hydrocarbon containing from 7 to 16 carbon atoms, when the silica-alumina is a completely amorphous, micromesoporous silica-alumina (1a) having a $SiO_2/Al_2O_3$ molar ratio comprised between 30 and 500, a surface area greater than 500 $m^2/g$, a pore volume comprised between 0.3 and 1.3 ml/g, an average pore diameter smaller than 40 Å.

An other object of the present invention relates to a process for producing a hydrocarbon fraction useful as diesel fuel or as a component of diesel fuel, from a mixture of a biological origin containing esters of fatty acids, and possibly also containing free fatty acids, comprising hydrotreatment of the mixture of a biological origin in the presence of a catalytic composition comprising:

A) an amorphous carrier of an acidic nature, selected from:

(1) an amorphous silica-alumina having a $SiO_2/Al_2O_3$ molar ratio higher than or equal to 5, (2) a porous solid comprising silicon, aluminium, phosphorus and oxygen bonded together so as to form an amorphous mixed oxide forming a single phase, characterized by a Si/Al atomic ratio ranging from 15 to 250, a P/Al ratio of at least 0.1, but lower than 5, preferably ranging from 0.3 to 3.5, a total pore volume of between 0.5 and 2.0 ml/g, an average pore diameter of between 3 nm and 40 nm and a specific surface area ranging from 200 to 1,000 $m^2/g$, preferably from 300 to 900;

B) a metallic component containing one or more metals of group VIII, possibly in a mixture with one or more metals of group VIB, with the proviso that if the catalytic composition consists of a silica-alumina of type (1) and Pt, it is pre-treated with a hydrocarbon containing 7 to 16 carbon atoms.

A particularly preferred object of the present invention relates to a process for producing a hydrocarbon fraction which can be used as diesel fuel or component of diesel fuel, starting from a mixture of a biological origin containing esters of fatty acids, and possibly also containing free fatty acids, comprising hydrotreatment of the mixture of a biological origin in the presence of a catalytic composition comprising:

A) a porous amorphous carrier of an acidic nature, selected from:

(1) a completely amorphous micro-mesoporous silico-alumina (1a) having an $SiO_2/Al_2O_3$ molar ratio ranging from 30 to 500, a surface area greater than 500 m$^2$/g, a pore volume ranging from 0.3 to 1.3 ml/g, an average pore diameter lower than 40 Å, (2) a porous solid comprising silicon, aluminium, phosphorus and oxygen bonded together so as to form an amorphous mixed oxide forming a single phase, characterized by a Si/Al atomic ratio ranging from 15 to 250, a P/Al ratio of at least 0.1, but lower than 5, preferably ranging from 0.3 to 3.5, a total pore volume of between 0.5 and 2.0 ml/g, an average pore diameter of between 3 nm and 40 nm and a specific surface area ranging from 200 to 1,000 m$^2$/g, preferably from 300 to 900;

B) a metallic component containing one or more metals of group VIII, possibly in a mixture with one or more metals of group VIB, with the proviso that if the catalytic composition consists of a silica-alumina of type (1a) and Pt, it is pre-treated with a hydrocarbon containing 7 to 16 carbon atoms.

With the hydrotreatment process of the present invention, comprising the treatment of mixtures of a biological origin in a hydrogen atmosphere, with the catalytic compositions described above, the hydrogenation, deoxygenation and isomerization of these mixtures are obtained contemporaneously.

The mixtures of a biological origin used in the process of the present invention contain esters of fatty acids, possibly with aliquots of free fatty acids, and can be mixtures of a vegetable or animal origin. The amount of fatty acids can vary for example from 2 to 20% by weight with respect to the total mixture of a biological origin. The esters of fatty acids contained in said mixtures are typically triglycerides of fatty acids, wherein the hydrocarbon chain of the fatty acid can contain from 12 to 24 carbon atoms and can be mono- or poly-unsaturated. The mixtures of a biological origin can be selected from vegetable oils, vegetable fats, animal fats, fish oils or mixtures thereof. Vegetable oils or fats can be sunflower, rape, canola, palm, soya, hemp, olive, linseed, peanut, castor, mustard, coconut oils or fatty oils contained in the pulp of pine trees (tall oil), or mixtures thereof. Animal oils or fats can be selected from bacon-fat, lard, tallow, milk fats, and mixtures thereof. Recycled fats or oils of the food industry, of either an animal or vegetable origin, can also be used. The vegetable oils or fats can also derive from plants selected by genetic manipulation.

The mixtures of a biological origin used in the process of the present invention can also be mixed with other components before being fed to the process, for example mixed with one or more hydrocarbons.

When the amorphous carrier of an acidic nature used in the catalytic composition of the present invention is a silico-alumina with a molar ratio greater than or equal to 5, said silico-alumina (1) can, for example, be prepared as described in U.S. Pat. No. 5,891,235, U.S. Pat. No. 4,929,431, U.S. Pat. No. 5,236,680, U.S. Pat. No. 5,135,641, U.S. Pat. No. 6,995, 112, U.S. Pat. No. 4,988,659, U.S. Pat. No. 4,711,868, U.S. Pat. No. 4,517,074 and as described for example in the following references: A. Taguchi, F. Schuth, "Ordered mesoporous materials in catalysis", Microporous and Mesoporous Materials, 77 (2005) 1-45; Z. Vit, Solcová, Microporous and Mesoporous Materials, 96 (2006) 197-204; A. Galarneau, M. Cangiotti, F. di Renzo, F. Sartori, M. F. Ottaviani, J. Phys. Chem. B, 2006, 110 (41), 20202-20210-DOI: 10.1021/ jp064115i; M. Yabuchi, R. Takahashi, S. Sato, T. Sodesawa, K. Ogura, Phys. Chem. Chem. Phys., 2002, 4, 4830-4837.

A preferred aspect is that the carrier used in the catalytic composition of the present invention is a porous, amorphous carrier, of an acidic nature selected from the following types:

(1) a completely amorphous, micro-mesoporous silico-alumina (1a) having a $SiO_2/Al_2O_3$ molar ratio ranging from 30 to 500, a surface area greater than 500 m$^2$/g, a pore volume ranging from 0.3 to 1.3 ml/g, an average pore diameter lower than 40 Å, (2) a porous solid comprising silicon, aluminium, phosphorus and oxygen bonded together so as to form an amorphous mixed oxide forming a single phase, characterized by a Si/Al atomic ratio ranging from 15 to 250, a P/Al ratio of at least 0.1, but lower than 5, preferably ranging from 0.3 to 3.5, a total pore volume of between 0.5 and 2.0 ml/g, an average pore diameter of between 3 nm and 40 nm and a specific surface area ranging from 200 to 1,000 m$^2$/g.

Materials which can be used as porous amorphous carrier, of an acidic nature of the type (1a) are completely amorphous silico-aluminas described in U.S. Pat. No. 5,049,536, EP 659478, EP 812804, and called MSA. The silico-aluminas of the type (1a) preferably have a $SiO_2/Al_2O_3$ molar ratio ranging from 50 to 300. Their XRD powder spectrum does not have a crystalline structure and does not show any peak.

According to a preferred aspect, the preferred carrier of an acidic nature (1a) has a porosity ranging from 0.3 to 0.6 ml/g.

Materials which can be used as porous, amorphous carrier, of an acidic nature of the type (2) are mixed oxides of silicon, aluminum and phosphorous described in WO 2005/002725, WO 2005/002726, WO 2005/003262.

In its most general form, the acid carrier of type (2) of the catalyst used in the present invention essentially comprises an amorphous homogeneous phase of mixed oxide of silicon, aluminum and phosphorous, wherein the phosphorous is in the maximum oxidation state (+5) and is prevalently bound to the matrix of the other oxides by means of P—O—Al bonds, as can be determined by means of $^{27}$Al-NMRe$^{31}$P-NMR spectroscopy analysis. It has a very high surface area (determined with the BET method), preferably ranging from 300 to 900 m$^2$/g, more preferably from 400 to 800 m$^2$/g, and a pore size within the range of mesopores, preferably with an average diameter (determined with the DFT method) ranging from 5 to 30 nm, more preferably from 6 to 25 nm. The porosity (total pore volume in ml/g) is extremely high and can be regulated, within certain limits, by means of the times, temperatures and other processing parameters during the formation of the gel in the preparation process of said carrier. The porosity of the amorphous carrier of type (2) preferably ranges from 0.7 to 1.7 ml/g.

Morphologically, the catalytically active amorphous solid of type (2) of the present invention comprises a non-ordered pore lattice with an essentially monomodal size distribution within a relatively wide range. The difference in the pore dimensions between 10% and 90% in the distribution curve is preferably within a diameter range of 2 to 40 nm, preferably between 5 and 30 nm. The oxides forming the matrix are in turn disorderly arranged in a three-dimensional polymer lattice, without forming crystalline structures detectable with X-rays.

The most advantageous results were obtained when the P/Al ratio ranges from 0.3 to 3.5 and particularly within the range of 0.5 to 2.5.

The Si/Al atomic ratio preferably ranges from 20 to 200, more preferably from 25 to 150.

Said amorphous carrier of type (2) can also include, if necessary, smaller quantities of other components, in a mixture or dispersed in the oxide matrix, in particular other metallic compounds, especially oxides, different from those forming component (B). These additional components do not generally form more than 20% by weight of the amorphous solid, preferably up to 10% by weight. In particular, the carrier of the catalyst of the present invention of type (2) can contain, in a mixture, oxides of phosphorous or phosphates not bound to the silica matrix and amorphous alumina. Other oxides which can be present are those of certain transition metals, particularly selected from Ti, Zr, V, Zn, Ga and Sn, whereas alkaline or alkaline earth metals are preferably absent or only present in traces.

With respect to silico-aluminas which are suitable as carrier of type (1a), various preparation methods are described in U.S. Pat. No. 5,049,536, EP 659478, EP 812804. Silico-aluminas of type (1a), for example, can be prepared, in accordance with EP 659478, starting from tetra-alkylammonium hydroxide, an aluminum compound which can be hydrolyzed to $Al_2O_3$, and a silicon compound which can be hydrolyzed to $SiO_2$, wherein said tetra-alkylammonium hydroxide is a tetra ($C_2$-$C_5$)alkylammonium hydroxide, said hydrolyzable aluminum compound is an aluminum tri($C_2$-$C_4$)alkoxide and said hydrolyzable silicon compound is a tetra($C_1$-$C_5$)alkylorthosilicate: these reagents are subjected to hydrolysis and gelification operating at a temperature equal to or higher than the boiling point, at atmospheric pressure, of any alcohol which is developed as by-product of said hydrolysis reaction, without the elimination or substantial elimination of said alcohols from the reaction environment. The gel thus produced is dried and calcined, preferably in an oxidizing atmosphere at a temperature ranging from 500 to 700° C., for a period of 6-10 hours. It is preferable to operate by preparing an aqueous solution of the tetra-alkylammonium hydroxide and aluminum trialkoxide and the tetra-alkylorthosilicate is added to said aqueous solution, operating at a temperature lower than the hydrolysis temperature, with a quantity of the reagents which is such as to respect the $SiO_2/Al_2O_3$ molar ratio of 30/1 to 500/1, the tetra-alkylammonium hydroxide/$SiO_2$ molar ratio of 0.05/1 to 0.2/1 and $H_2O/SiO_2$ molar ratio of 5/1 to 40/1, the hydrolysis and gelification is caused by heating to a temperature higher than approximately 65° C. up to about 110° C., operating in an autoclave at the autogenous pressure of the system, or at atmospheric pressure in a reactor equipped with a condenser.

According to EP 812804, silico-aluminas of the type (1a) which can be used as component (A) of the catalytic composition for the process of the present invention can be prepared by means of a process which comprises:

preparing a mixture starting from a tetra-alkylorthosilicate, a $C_3$-$C_6$ alkyl alcohol or dialcohol, a tetra-alkylammonium hydroxide having the formula $R_1(R_2)_3NOH$ wherein $R_1$ is a $C_3$-$C_7$ alkyl and $R_2$ is a $C_1$ or $C_3$-$C_7$ alkyl, in the presence of a hydrolyzable aluminum compound, wherein the molar ratios fall within the following ranges:
alcohol/$SiO_2 \leq 20$
$R_1(R_2)_3NOH/SiO_2=0.05$-0.4
$H_2O/SiO_2=1$-40
$Al_2O_3/SiO_2$ greater than 0 and less than 0.02
subjecting said mixture to hydrolysis and subsequent gelification at a temperature close to the boiling point of the alcohol or mixture of alcohols present;
subjecting the gel obtained to drying and calcination.

The silico-alumina of type (1) which is used as carrier in the process of the present invention, and in particular the silico-alumina of type (1a), can be in the form of an extruded product containing traditional binders, such as for example aluminum oxide, bohemite or pseudobohemite. The extruded product can be prepared according to techniques well-known to experts in the field. The silico-alumina of type (1) and, in particular, the silico-aluminas of type (1a), and the binder can be premixed in weight ratios ranging from 30:70 to 90:10, preferably from 50:50 to 70:30. At the end of the mixing, the product obtained is consolidated into the desired end-form, for example extruded pellets or tablets. According to a preferred embodiment the methods and binders described in EP 550922 and EP 665055 can be used, the latter being preferred, whose contents are incorporated herein as reference. Typically, according to EP 665055, the following method is adopted:

(a) an aqueous solution of a tetra-alkylammonium hydroxide (TAA-OH), a soluble aluminum compound capable of hydrolyzing to $Al_2O_3$ and a silicon compound capable of hydrolyzing to $SiO_2$, is prepared in the following molar ratios:
$SiO_2/Al_2O_3$ from 30/1 to 500/1
TAA-OH/$SiO_2$ from 0.05/1 to 0.2/1
$H_2O/SiO_2$ from 5/1 to 40/1

(b) the solution thus obtained is heated to cause its hydrolysis and gelification and obtain a mixture with a viscosity ranging from 0.01 to 100 Pa sec;

(c) a binder belonging to the group of bohemites or pseudobohemites, is first added to the mixture obtained in step (b), in a weight ratio with said mixture ranging from 0.05 to 0.5, and subsequently a mineral or organic acid in a quantity ranging from 0.5 to 8.0 g per 100 g of binder;

(d) the mixture obtained under point (c) is heated under stirring to a temperature ranging from 40 to 90° C., until a homogeneous paste is obtained, which is subjected to extrusion and granulation;

(e) the extruded product is dried and calcined in an oxidizing atmosphere. In step (c) it is also possible to operate inverting the order of addition, i.e. adding the mixture obtained in step (b) to the binder.

Plasticizing agents, such as methylcellulose, are preferably also added in step (c) to favour the formation of a homogeneous and easily processable paste.

In this way a granular acid carrier is obtained, preferably containing a quantity ranging from 30 to 70% by weight of inert inorganic binder, the remaining quantity consisting of amorphous silico-alumina essentially having the same characteristics with respect to porosity, surface extension and structure described above for the same silico-alumina of the type (1a) without a binder.

In step (c), it is also possible to add phosphorous by the addition of a phosphorous compound, such as phosphoric acid, thus obtaining a granular acid carrier preferably containing a quantity of 30 to 70% by weight of inert inorganic binder, the remaining quantity consisting of amorphous silico-alumina and phosphorous, the latter preferably in a quantity ranging from 0.06 to 8.29% by weight with respect to the total weight of the composition. In order to obtain these compositions, an adequate quantity of a phosphorous compound is used, considering that all the phosphorous added in step (c) will be found in the end-product. The material thus obtained is new and is a further object of the present invention.

The solid amorphous carriers of type (2) can be prepared using all the sol-gel methods indicated above for micro-mesoporous silico-aluminas based on silicon, aluminum and oxygen alone, by the addition of an appropriate quantity of a suitable phosphorous compound in any of the steps prior to the calcination step, preferably before or during the formation of the gel. Suitable methods for preparing amorphous solids of type (2) are described in WO 2005/002725, WO 2005/002726 and WO 02005/003262, whose content is incorporated herein as reference. In accordance with this, an advantageous method for the preparation of said amorphous solid (2) comprises, in a first step, the preparation of a mixture comprising a tetra-alkyl ammonium hydroxide, an aluminum compound and a silicon compound hydrolyzable to the corresponding hydrated oxides, an oxygenated compound of phosphorous in the desired proportions, and a sufficient quantity of water for solubilizing and hydrolyzing said compounds, wherein said tetra-alkyl ammonium hydroxide comprises from 1 to 10 carbon atoms in each alkyl residue, said hydrolyzable aluminum compound is preferably an aluminum trialkoxide comprising from 1 to 10 carbon atoms in each alkoxide residue, said hydrolyzable silicon compound is a silicate of at least one hydrocarbon residue, preferably a tetra-alkylorthosilicate, comprising from 1 to 10 carbon atoms for each alkyl residue, and said oxygenated compound of phosphorous is a salt or a phosphate or phosphonic ester or the corresponding acid, preferably an ammonium salt or a phosphate or phosphonic ester wherein each alkyl residue comprises from 1 to 10 carbon atoms. The aqueous mixture of the above compounds is then hydrolyzed and gelified in a second step, by heating in an alkaline environment, preferably at a pH higher than 10, either at reflux or in a closed container, at the normal boiling point or higher, or in an open container below this temperature, so that there is essentially no exchange of material with the outside environment. The gel thus produced is subsequently subjected to a third drying and calcination step. The aqueous mixture in said first step can be formed in water or in a mixture of water and a soluble oxygenated organic compound, preferably an alcohol having from 1 to 10 carbon atoms, in a quantity of up to 1/1 in moles with respect to the water.

In the first step, the quantity of the constituents of the mixture are also such as to respect the atomic ratios between the elements which are to be obtained at the end of the preparation in the catalytically active solid; the following atomic or molar ratios are conveniently used: Si/Al from 10/1 to 250/1, (tetra-alkyl ammonium hydroxide)/Si from 0.05/1 to 0.2/1, $H_2O/SiO_2$ from 5/1 to 40/1, P/Al from 0.1 to 5.0. The preferred values for these ratios are: Si/Al from 30/1 to 150/1, tetra-alkyl ammonium hydroxide/$SiO_2$ from 0.05/1 to 0.2/1, P/Al from 0.5 to 3.5, and $H_2O/SiO_2$ from 10/1 to 25/1. The reagents are heated to a temperature of 30 to 80° C. until a limpid solution is obtained. The reagents which can be used and the reaction conditions, particular or preferred, are described in WO 2005/002725, WO 2005/002726 e WO 2005/003262. An ageing step of the gel from 1 to 24 hours is preferably effected between the second and third step.

If the amorphous carrier of type (2) also contains small quantities of other components, in a mixture or dispersed in the oxide matrix, in particular other metallic compounds, especially oxides, different from those forming component (B), or contains a mixture of phosphorous oxides or phosphates not bound to the silica and amorphous alumina matrix, hydrolyzable compounds of these metals can be added during the synthesis of the gel or compounds of these metals and/or oxygenated compounds of phosphorous can be mixed with the carrier of type (2).

According to what is known in the art of heterogeneous catalysis, the above amorphous carrier of type (2) of the catalyst of the present invention can be advantageously mixed and processed with other inert components, such as, for example, pseudobohemite, which, by calcination, becomes γ-alumina, suitable for giving improved mechanical and morphological properties, desirable in the industrial use of the same, especially for improving the consistency and stability of the granules in the catalytic beds, thus increasing the hardness and reducing the quantity of catalyst residues in the product obtained. The incorporation of said inert component in the catalyst carrier can be effected either by addition to the amorphous carrier of type (2) in the gel step or following the drying or calcination, or by addition to the preformed catalyst comprising the metal (B).

Consequently said carrier of type (2) can, if necessary, form a composition in a mixture with a suitable quantity of a binder consisting of an inert inorganic solid, generally added for the purpose of improving the mechanical properties, such as for example, silica, alumina, clay, titanium oxide ($TiO_2$) or zirconium oxide ($ZrO_2$), or boron oxide ($B_2O_3$), or mixtures thereof.

Possible binders can be all those known to be suitable for the purpose, either natural or synthetic, preferably silica and alumina, and particularly alumina in all its known forms, for example gamma-alumina.

In particular, according to a preferred method described in WO 2005/002725, WO 2005/002726 and WO 2005/003262, the gel obtained from the hydrolysis and gelification of the aqueous mixture of Al alkoxide, tetra-alkyl silicate and oxygenated compound of phosphorous, prepared as described above, is mixed, before the calcination step, with the desired quantity of inorganic binder, based on the dry weight, usually with a weight ratio between binder and gel (wet) within the range of 0.05 and 0.5. A plasticizing agent selected from those known as being suitable for the purpose, for example methyl cellulose, stearin, glycerol, more preferably methyl cellulose, is preferably also added, in order to favour the formation of a homogeneous and easily processable paste. Said plasticizer is generally added in a quantity ranging from 5 to 20 g per 100 g of binder.

A suitable acidifying compound is then added, selected from organic acids, such as acetic acid or acetic anhydride, oxalic acid, or inorganic acids, such as hydrochloric acid or phosphoric acid, in a quantity preferably ranging from 0.5 to 8 g per 100 g of binder. Acetic acid is particularly preferred.

In this step, if the amorphous carrier of type (2) also contains a small quantity of other components, in a mixture or dispersed in the oxide matrix, in particular other metallic compounds, especially oxides, different from those forming component (B), or if it contains a mixture of phosphorous oxides or phosphates not bound to the silica and amorphous alumina matrix, compounds of these metals and/or oxygenated compounds of phosphorous can be added to the wet gel.

The mixture thus obtained is homogenized by mixing and heating to a temperature of 40 to 90° C., with partial evaporation of the solvent, until a paste is obtained, and then extruded with a suitable apparatus. The extruded product is cut into cylindrical granules, preferably having dimensions of 2-10 mm in length and 0.5-4.0 mm in diameter. According to an alternative embodiment, the above homogeneous paste can also be dried in a suitable granulator, in order to obtain granules having the desired dimensions.

The granules thus obtained are subjected to progressive heating to eliminate the residual quantity of solvent and finally calcined in an oxidizing atmosphere, generally in a stream of air, at a temperature ranging from 400 to 600° C. for 4-20, preferably 6-12 hours.

In this way a granular acid solid is obtained, having the desired catalytic and mechanical properties, containing a quantity of 1 to 70% by weight, preferably from 20 to 50% by weight, of said inert inorganic binder, the remaining percentage consisting of the amorphous carrier of type (2) as defined above. The granular solid is preferably in the form of pellets having a dimension of around 2-5 mm in diameter and 2-10 mm in length.

Both the porosity and surface area of the extruded product normally have a mediated value with respect to the values of the single components of the mixture, according to linear composition rules.

The metals contained in the metallic component (B) of the catalytic compositions used in the process of the present invention are selected from metals of group VIII, optionally mixed with one or more metals of group VIB. The metal or metals of group VIII are preferably selected from Pt, Pd, Ni and Co.

In particular, when the metallic component contains only metals of group VIII, the metal or metals are preferably selected from Pt, Pd and Ni. When the metallic component contains both one or more metals of group VIII and one or more metals of group VIB, the metal of group VIII is preferably selected from Ni and Co.

The metal of group VIB is preferably selected from Mo and W.

The metal of group VIII is preferably in a quantity ranging from 0.1 to 5% by weight with respect to the total weight of the catalytic composition formed by components A and B. The metal of group VIB, when present, is in a quantity ranging from 1 to 50, even more preferably in a quantity ranging from 5 to 35% by weight with respect to the total weight of the catalytic composition formed by components A and B. The weight percentage of the metal, or metals, refers to the metal content expressed as a metallic element; in the final catalyst, after calcination, said metal is in the form of an oxide.

The metals of group VIII, and optionally group VI, contained in the catalytic composition used in the present invention, can be deposited onto the carrier (A), as such or in extruded form, with all the techniques known to experts in the field. Catalytic compositions which can be well used in the present invention containing one or more metals of group VIII, and their preparations, are described in EP 582347, EP 1101813, WO 2005/103207, WO 2002/002725, WO 2005/002726 and WO 2005/003262, whose contents are incorporated herein as reference.

In particular, EP 582347 describes catalytic compositions containing one or more metals of group VIII and a carrier of silica gel and alumina amorphous to X-rays, with a $SiO_2/Al_2O_3$ molar ratio ranging from 30 to 500, a surface area within the range of 500 to 1,000 $m^2/g$, a pore volume ranging from 0.3 to 0.6 ml/g and a pore diameter prevalently within the range of 10 to 30 Å. EP 1101813 describes catalytic compositions, which can be used for the preparation of medium distillates, containing one or more metals of group VIII and a carrier of silica gel and calcined alumina, amorphous to X-rays, with a $SiO_2/Al_2O_3$ molar ratio ranging from 30 to 500, a surface area within the range of 500 to 1,000 $m^2/g$, a pore volume ranging from 0.2 to 0.8 ml/g and an average pore diameter within the range of 10 to 40 Å.

WO 2005/103207 describes catalytic compositions which can be used for the upgrading of distillates, containing one or more metals selected from Pt, Pd, Ir, Ru, Rh and Re and a silico-alumina carrier, amorphous to X-rays, with a $SiO_2/Al_2O_3$ molar ratio ranging from 30 to 500, a surface area greater than 500 $m^2/g$, a pore volume ranging from 0.3 to 1.3 ml/g and an average pore diameter less than 40 Å.

WO 2005/002725, WO 2005/002726 and WO 2005/003262 describe materials comprising the acid carrier, amorphous and porous of type (2), and at least one metal with a hydrodehydrogenating activity selected from groups 6 to 10 of the periodic table of elements.

In general, in the compositions used in the present invention, containing only the metal of group VIII, the metal, according to the preparations described in the patents indicated above, can be introduced by means of impregnation or ion exchange. According to the first technique, the component of an acid nature (A), also in extruded form, is wet with an aqueous solution of a compound of the metal of group VIII, operating for example at room temperature, and at a pH ranging from 1 to 4. The extruded form is preferably prepared according to the processes described in EP 665055, in WO 2005/002725, WO 2005/002726 and WO 2005/003262, in which the binder is mixed with the wet gel before the calcination step.

The aqueous solution preferably has a concentration of metal expressed as g/l ranging from 0.2 to 2.0. The resulting product is dried, preferably in air, at room temperature, and is calcined in an oxidizing atmosphere at a temperature ranging from 200 to 600° C.

In the case of alcohol impregnation, the acid component (A), also in extruded form, is suspended in an alcohol solution containing the metal. Also in this case, the extruded form is preferably prepared according to the processes described in EP 665055, in WO 2005/002725, WO 2005/002726 and WO 2005/003262, in which the binder is mixed with the wet gel before the calcination step. After impregnation the solid is dried and calcined.

According to the ion exchange technique, the acid component (A), also in extruded form, is suspended in an aqueous solution of a complex or salt of the metal, operating at room temperature and a pH ranging from 6 to 10. The extruded form is preferably prepared according to the processes described in EP 665055, in WO 2005/002725, WO 2005/002726 and WO 2005/003262, in which the binder is mixed with the wet gel before the calcination step. After the ion exchange, the solid is separated, washed with water, dried and finally thermally treated in an inert or oxidizing atmosphere. Temperatures which can be used for the purpose are those ranging from 200 to 600° C.

Compounds of metals which can be well used in the preparations described above are: $H_2PtCl_6$, $Pt(NH_3)_4(OH)_2$, $Pt(NH_3)_4Cl_2$, $Pd(NH_3)_4(OH)_2$, $PdCl_2$, $(CH_3COO)_2Ni$, $(CH_3COO)_2Co$. When the catalytic composition comprises more than one metal of group VIII the impregnation is carried out as follows: the acid component (A), also in extruded form, is wet with a solution of a compound of a first metal, the resulting product is dried, it is optionally calcined, and is impregnated with a solution of a compound of a second metal. Also in this case, the extruded form is preferably prepared according to the processes described in EP 665055, in WO 2005/002725, WO 2005/002726 and WO 2005/003262, in which the binder is mixed with the wet gel before the calcination step. The product is dried and is then calcined in an oxidizing atmosphere at a temperature ranging from 200 to 600° C. Alternatively a single aqueous solution containing two or more compounds of different metals can be used for contemporaneously introducing said metals.

Before being used, the catalyst is activated by the known techniques, for example by means of a reduction treatment, and preferably by means of drying and subsequent reduction. The drying is effected in an inert atmosphere at temperatures ranging from 25 to 100° C., whereas the reduction is obtained by thermal treatment of the catalyst in a reducing atmosphere ($H_2$) at a temperature ranging from 300 to 450° C., and a pressure preferably ranging from 1 to 50 bar. Catalytic compositions which can be well used in the present invention containing one or more metals of group VIII and additionally one or more metals of group VIB, and their preparations, are described in EP 908231, EP 1050571 and WO 2005/002725, WO 2005/002726 and WO 2005/003262. In particular, EP 908231 describes catalytic compositions containing a mixture of metals belonging to groups VIB and VIII and a carrier of silica gel and alumina amorphous to X-rays, with a $SiO_2/Al_2O_3$ molar ratio ranging from 30 to 500, a surface area within the range of 500 to 1,000 m$^2$/g, a pore volume ranging from 0.3 to 0.6 ml/g and an average pore diameter within the range of 10 to 40 Å. When the catalyst also contains a metal of group VIB in the metallic phase (B), the catalyst can be prepared by means of aqueous or alcohol impregnation. More specifically, according to a first technique, component (A), also in extruded form, is wet with an aqueous solution of a compound of the desired metal of group VIB, operating at room temperature or a temperature close to room temperature. Also in this case, the extruded form is preferably prepared according to the processes described in EP 665055, in WO 2005/002725, WO 2005/002726 and WO 2005/003262, in which the binder is mixed with the wet gel before the calcination step. After aqueous impregnation, the solid is dried and then a new impregnation is effected with an aqueous solution of a compound of the desired metal of group VIII. After aqueous impregnation, the solid is dried again and thermally treated in an oxidizing atmosphere. Suitable temperatures for this thermal treatment range from 200 to 600° C. The aqueous impregnation of the metallic phase can also be effected in a single step, wherein the acid carrier (A) is wet with a single aqueous solution containing both of the metal compounds of groups VIB and VIII, subsequently proceeding with the same operating procedures described above. In the alcohol impregnation technique, component (A), also in extruded form, is suspended in an alcohol solution of a compound of a metal of group VIB and a compound of a metal of group VIII, operating at room temperature or a value close to room temperature. The extruded form is preferably prepared according to the processes described in EP 665055, in WO 2005/002725, WO 2005/002726 and WO 2005/003262, in which the binder is mixed with the wet gel before the calcination step. After impregnation the solid is dried, preferably in air, at a temperature of about 100° C. and thermally treated in an oxidizing atmosphere, preferably in air.

According to a further alternative, in accordance with what is described in WO 2005/002725, WO 2005/002726 and WO 2005/003262, the salt of the metal (B) can be included in the catalytically active carrier of type (2) in the gel preparation step, for example before the hydrolysis for the formation of the wet gel, or before the calcination of the same.

The final catalyst for the process described herein can be formulated and formed into extruded products having different forms (for example cylindrical, trilobated, etc.) as described for example in EP 1101813 and in WO 2005/2725.

The catalytic compositions used in the present invention have the characteristic of being water-resistant. The possible inhibiting effect of water on the catalytic activity can be neutralized through a moderate increase in the temperature, whereas no irreversible deactivation has been observed. The quantity of water present in the liquid product is equal to about 10% w/w.

In the process, there is the hydrogenation of the double bonds present in the ester chains of the triglycerides, the demolition of the triglyceride structure, deoxygenation, by means of both decarboxylation, decarbonylation and also by hydrogenation with the formation of water, and skeleton isomerization with the formation of branched compounds.

The process is carried out in a reaction zone comprising one or more catalytic beds, in one or more reactors. According to a preferred aspect, it is carried out in a typical fixed-bed hydrotreatment reactor. The flow of hydrogen and feedstock of a biological origin can be sent in equicurrent or in countercurrent. The reactor can have adiabatic catalytic beds in a number higher than or equal to 2. As the deoxygenation reaction is an exothermic reaction and skeleton isomerization is slightly exothermic the process can be considered exothermic on the whole. As this is an exothermic process, with the production of heat, there will be a temperature rise in each catalytic bed. By feeding a stream of hydrogen and/or liquid feedstock between one catalytic bed and another, at a certain temperature, it is possible to obtain a constant or increasing temperature profile. This operating mode is normally indicated as "splitted feed".

As an alternative to a reactor with adiabatic layers, resort can be made to a tube-bundle reactor. The catalyst is suitably charged inside the tubes, whereas a diathermic liquid (dowtherm oil) is sent into the side mantle with the aim of removing the reaction heat.

For a better regulation of the thermal profile in the reactor with both adiabatic layers and a tube-bundle, the reactor itself can be run with the recirculation of a part of the effluents, according to the typology known as recycling reactor. The function of the recycling is to dilute the fresh feedstock in the reactor thus limiting the thermal peaks due to the exothermicity of the reaction. The recycling ratio, i.e. the amount of recirculated fraction with respect to the fresh feedstock can vary from 0.5 to 5 w/w.

A further reactor configuration which can be used for this application is a slurry reactor in which the catalyst is suitable formed into microspheres and dispersed in the reaction environment. The gas-liquid-solid mixing in this case can be favoured by mechanical stirring or by forced recirculation of the reaction fluids.

The hydrotreatment process is preferably carried out at a pressure varying from 25 to 70 bar, preferably from 30 to 50 bar, and at a temperature ranging from 250 to 480° C., preferably from 280 to 450° C. It is preferable to operate with an LHSV ranging from 0.5 to 2 hours$^{-1}$, even more preferably from 0.5 to 1 hour$^{-1}$. The $H_2$/mixture of biological origin ratio preferably ranges from 400 to 2,000 Nl/l.

Before the hydrotreatment step, the feedstock of a biological origin can be suitably treated in order to remove the content of alkaline metals (for example Na, K) and alkaline earth metals (for example Ca), possibly contained in the feedstock. This pre-treatment can be carried out by adsorption on a suitable material: for example, the known percolation techniques can be used on a column filled with acidic earth or clays such as for example acid montmorillonites, bentonites, smectites, sepiolites. For this purpose, products available on the market such as Filtrol, Tonsil, Bentolites H and L, SAT-1, can be used.

Alternatively, ion exchange resins can be used, or slightly acid washings, effected for example by contact with sulfuric acid, nitric acid or hydrochloric acid, preferably at room temperature and atmospheric pressure.

When the catalytic composition of the present invention is composed of Pt and, as amorphous carrier, a silico-alumina of type (1), and in particular a completely amorphous, micro-mesoporous silico-alumina of type (1a) having an $SiO_2/Al_2O_3$ molar ratio ranging from 30 to 500, a surface area greater than 500 m$^2$/g, a pore volume ranging from 0.3 to 1.3 ml/g, an average pore diameter lower than 40 Å, said composition is pre-treated with a hydrocarbon containing from 7 to 16 carbon atoms before being used in the process of the present invention.

The pre-treatment is preferably effected in continuous, at a temperature ranging from 100 to 500° C., preferably from 200 to 400° C., in the presence of hydrogen, at a pressure preferably ranging from 5 to 50 bar. It is preferable to operate with an LHSV ranging from 0.5 to 2 hours$^{-1}$, even more preferably from 1 to 2 hours$^{-1}$. The $H_2$/hydrocarbon ratio preferably ranges from 400 to 2,000 Nl/l.

This pre-treatment can optionally also be well-used on catalytic compositions composed of Pt, a silico-alumina of type (2) and a binder.

According to a preferred aspect, said pre-treatment can be used on all the catalytic compositions of the present invention containing components A and B and possibly a binder.

This pre-treatment is new and is a further object of the present invention. The pre-treatment is effected after the activation step of the catalysts by means of the known techniques, for example by means of reduction treatment, and preferably by means of drying and subsequent reduction. The pre-treatment, when used, can be carried out in the same reactor in which the process object of the invention for the production of a hydrocarbon fraction useful as diesel fuel, is then effected.

The effluents of the process are sent to a high-pressure gas-liquid separator. A gaseous phase, essentially consisting of hydrogen, water, CO and $CO_2$ and light paraffins ($C_4^-$), is recovered. $NH_3$, $PH_3$ may also be present in small quantities. After separation, the gaseous phase is cooled and the water (possibly containing traces of alcohols and carboxylic acids) and condensable hydrocarbons are separated by condensation. The remaining gaseous phase is purified to allow the recycling of the hydrogen to the reaction step (1). Methods of the known art are adopted for the purification, by means of caustic washings, for example with aqueous solutions of NaOH or $Ca(OH)_2$, or by means of the well-known purification technique with amines (for example MEA, mono-ethanolamine, or DEA, diethanolamine). At the end of the purification the $CO_2$, $PH_3$ and $NH_3$ are removed and the gaseous fraction thus obtained essentially consists of $H_2$ with possible traces of CO. In order to limit the accumulation of CO in the recycled gases, it can be removed by washing with cuproammonia or by methanation, according to technologies known to experts in the field.

The liquid phase separated in the high-pressure separator consists of a hydrocarbon fraction, essentially consisting of linear and branched paraffins, with a number of carbon atoms ranging from 14 to 21, prevalently from 15 to 19. Depending on the operating conditions of the separator, the liquid fraction can contain small quantities of $H_2O$ and oxygenated compounds, such as for example alcohols and carbonyl compounds. The liquid fraction can then be washed with a gaseous hydrocarbon, for example $C_4$, or nitrogen or hydrogen, in a stripper, in order to further reduce the water content.

The resulting mixture is subjected to distillation to obtain a purified hydrocarbon mixture which can be used as diesel fuel.

FIG. 1 illustrates a plant scheme which can be used in the process of the present invention for producing hydrocarbon fractions which can be used as diesel fuel, or components of diesel fuel, starting from a mixture of a biological origin (biological mixture) containing esters of fatty acids and optionally aliquots of free fatty acids. The scheme of FIG. 1 is in accordance with what is described above in relation to the process step (Reactor R), purification by means of a separator and distiller, for isolating the gas oil obtained.

For a more detailed description of the present invention, some practical embodiment examples are provided of the process, object of the present invention, which however are purely illustrative of particular aspects of the invention and can in no way be considered as limiting the overall scope of the invention.

EXAMPLE 1

Preparation of the Catalysts

Reagents and Materials

The following commercial reagents were used in the preparation described hereunder:

| | |
|---|---|
| tetrapropylammonium hydroxide (TPA-OH) | SACHEM |
| aluminum tri-isopropoxide | FLUKA |
| tetra-ethylsilicate | DYNAMIT NOBEL |
| alumina (VERSAL 250, Pseudo-Boehmite) | LAROCHE |
| methylcellulose (METHOCEL) | FLUKA |
| phosphoric acid | CARLO ERBA |

The reagents and/or solvents used and not indicated above are those most widely used and can be easily found at normal commercial operators specialized in the field.

(a) Preparation of a Silico-Alumina of Type (1) (MSA)

A 100 litres reactor was preliminarily washed with 75 litres of a solution at 1% by weight of tetrapropylammonium hydroxide (TPA-OH) in demineralized water, maintaining the liquid under stirring for 6 hours at 120° C. The washing solution is discharged and 23.5 litres of demineralized water, 19.6 kg of an aqueous solution at 14.4% by weight of TPA-OH (13.8 moles) and 600 g of aluminum tri-isopropoxide (2.94 moles) are introduced. The mixture is heated to 60° C. and kept under stirring at this temperature for 1 hour, so as to obtain a limpid solution. The temperature of the solution is then brought to 90° C. and 31.1 kg of tetra-ethylsilicate (149 moles) are rapidly added. The reactor is closed and the stirring rate is regulated to about 1.2 m/s, maintaining the mixture under stirring for three hours at a temperature ranging from 80 to 90° C., with thermostat-regulated control to remove the heat produced by the hydrolysis reaction. The pressure in the reactor rises to about 0.2 MPag. At the end, the reaction mixture is discharged and cooled to room temperature, obtaining a homogeneous and relatively fluid gel (viscosity 0.011 Pas) having the following composition molar ratios:

$SiO_2/Al_2O_3=101$
$TPA-OH/SiO_2=0.093$
$H_2O/SiO_2=21$ (b) Preparation of the Extruded MSA Product 1,150 g of alumina (VERSAL 150), previously dried for 3 hours in air at 150° C., and 190 g of methylcellulose, are charged into a 10 litre plough mixer, maintained at a stirring rate of 70-80 revs per minute. 5 kg of MSA prepared according to the previous step (a) are then added over a period of time of about 15 minutes, and left to rest for about 20 hours, and the mixture is left under stirring for about 1 hour. 6 g of glacial acetic acid are added and the temperature of the mixer is brought to about 60° C., subsequently continuing the stirring until a homogeneous paste is obtained, having the desired consistency for the subsequent extrusion.

The homogenous paste obtained as described above is charged into a HUTT type extruder, extruded and cut into cylindrical pellets having the desired size (about 2×4 mm). The product is left to rest for about 6-8 hours and then dried maintaining it in a stream of air at 100° C. for 5 hours. It is finally calcined in a muffle at 550° C. for 3 hours in a flow of nitrogen and for a further 8 hours in air.

A porous solid with acid characteristics is thus obtained, essentially consisting of silica/alumina (yield 95% with respect to the respective initial reagents), having a BET of 600 $m^2/g$.

(c) Impregnation of the Carrier with Platinum (Pt/Extruded MSA)

120 ml of an aqueous solution of hexachloroplatinic acid ($H_2PtCl_6$/HCl/$CH_3COOH$=1/0.84/0.05, [Pt]=7.69·10$^{-3}$ M) are dripped under slow stirring into a glass recipient containing 30 g of the porous solid prepared as described above. The mixture thus obtained is left under stirring for 1 hour at room temperature. The water is then evaporated at 60° C. at reduced pressure, over a period of about 1 hour. The solid obtained is then dried maintaining it at 150° C. for two hours, and calcined by heating in a muffle, in a stream of air, from room temperature to 350° C. over a period of two hours, left at 350° C. for two hours, then brought from 350° C. to 400° C. in 50 minutes, left at 400° C. for 3 hours. At the end, a supported Pt/MSA catalyst is obtained, which is tested in the subsequent examples, having the following characteristics:

59.6% by weight of amorphous silico-alumina of type (1) ($SiO_2/Al_2O_3$ molar ratio=102)
39.8% by weight of alumina (pseudo-bohemite)
0.6% by weight of platinum
Pore volume: 0.6 ml/g
BET: 600 m$^2$/g
Crushing strength: 10 kg/cm (radial); 90 kg/cm$^2$ (axial)

(d) Preparation of Silico-Alumina-Phosphorous of Type (2) (P-MSA)

239.50 ml of demineralized water, 3.40 g of an ammonia solution at 30% by weight and 2.30 g of a solution of phosphoric acid at 85% by weight (equivalent at 0.02 moles of ammonium phosphate ($NH_3$)$_3PO_4$) are charged into a three-necked flask equipped with a magnetic stirrer and condenser. 50.80 g of an aqueous solution of tetrapropyl ammonium hydroxide at 40% by weight (TPA-OH, 0.01 moles) and 4.08 g of aluminum tri-isopropoxide (0.02 moles) are added to the mixture thus obtained. The mixture is kept under stirring for 60 minutes at room temperature. 208 g of tetra-ethyl-orthosilicate (TEOS, 1.00 mole) are rapidly added to the limpid solution thus obtained and the temperature is brought to 60° C. The mixture is kept under stirring at 60° C. for 3 hours. The formation of a gel is observed. The mixture is brought to room temperature and is left to rest for 20 hours. The homogeneous gel thus obtained is characterized by the following molar ratios between the constituents:

Si/Al=5; TPA-OH/Si=0.098; $H_2O$/Si=15, Si/P=50.

The gel thus obtained is dried in air for 3 hours and then calcined at 550° C. in a flow of air for 5 hours. An amorphous solid is obtained, identified by the following empirical formula: $SiAl_{0.02}P_{0.02}O_{2.08}$. The morphological properties of the solid proved to be the following:

molar ratio Si/Al=50,
molar ratio P/Al=1
BET Surface area=700 m$^2$/g,
Pore volume $V_p$=0.96 ml/g
Pore diameter d=6.1 nm The absence of crystalline aggregates was confirmed by X-ray diffraction. NMR spectroscopy of the $^{31}$P and $^{27}$Al isotopes indicates that 80% of the phosphorous is bound through Al—O—P bonds to the amorphous silica-alumina matrix.

(e) Preparation of the Extruded P-MSA Product

The preparation of example (b) is repeated, using 5 kg of P-MSA prepared in example (d).

In this way, a porous solid with acid characteristics is obtained, essentially consisting of silica/alumina/phosphorous oxide (yield 95% with respect to the respective initial reagents), having a BET of 600 m$^2$/g, a pore volume of 0.91 ml/g and a pore diameter of 7.6 nm.

(f) Impregnation of the Carrier with Platinum (Pt/Extruded P-MSA)

The impregnation of example (c) is repeated using the extruded P-MSA carrier obtained in example (e).

At the end, a supported Pt/P-MSA catalyst is obtained, which is tested in the subsequent examples, having the following characteristics:

59.8% by weight of amorphous silica-alumina-phosphorous of type (2) ($SiO_2/Al_2O_3$ molar ratio=102, P/Al=1)
39.9% by weight of alumina (pseudo-bohemite)
0.59% by weight of platinum
Pore volume: 0.84 ml/g
Pore diameter: 7.3 nm
BET: 500 m$^2$/g Before being used in the deoxygenation/skeleton isomerization reaction, the materials obtained are reduced with hydrogen. The reduction is effected under the following conditions:

P=35 atm, from 30° C. to 340° C. in 16 hours, 340° C. for 2 hours.

EXAMPLE 2

Transformation of Soybean Oil

The experimentation is carried out in a continuous reactor fed with soya oil having the characteristics indicated in Table 1 (refined soybean oil).

TABLE 1

|  | Refined Soybean Oil |
|---|---|
| Palmitic acid % *(C16-0) | 13.06 |
| Stearic acid % *(C18-0) | 0.84 |
| Oleic acid % *(C18-1) | 27.09 |
| Linoleic acid % *(C18-2) | 53.63 |
| Linolenic acid % *(C18-3) | 5.11 |
| Arachidic acid % *(C20-0) | 0.07 |
| Acidity (mgKOH/g) | 0.11 |
| $H_2O$ (ppm) | 2200 |
| Na (ppm) | 0.3 |
| K (ppm) | 0.7 |
| Ca (ppm) | 0.3 |
| Mg (ppm) | 0.1 |
| Al (ppm) | 0.01 |
| P (ppm) | 0.65 |
| Fe (ppm) | <0.05 |
| Cu (ppm) | 0.02 |

*The first number in brackets indicates the carbon atoms, the second the unsaturations.

The operating conditions used are the following:
Temperature: 350° C.
LHSV: 0.5 hours$^{-1}$
Pressure: 35 bar
$H_2$/oil: 1500 Nl/l The vegetable oil is fed with hydrogen in equicurrent in the presence of the catalysts Pt/extruded MSA (c) and Pt/extruded P-MSA (f) described above.

The reactor is a reactor operating in continuous with a downward flow.

When the Pt/extruded MSA catalyst (c) is used, a pretreatment is carried out as follows:

reduction with hydrogen at P=35 atm, from 30° C. to 340° C. in 16 hours, 340° C. for 2 hours followed by treatment with a hydrocarbon containing 16 carbon atoms. The temperature is brought to a value of 320° C. in the presence of hydrogen. The pre-treatment with the hydrocarbon is effected at an LHSV equal to 1 hour$^{-1}$ whereas the $H_2$/hydrocarbon ratio is 1500 Nl/l.

The effluent product is separated, in a gas/liquid separator, from the gaseous fractions consisting of $H_2$, $CO/CO_2$ and $C_3/C_4$ light paraffins.

After separation of the water, the liquid product proves to consist of paraffins, with from 5 to 22 carbon atoms. Analysis of the liquid phase by means of GC gives a value higher than 80% as isomerization degree. The characteristics and distribution of the liquid product for Pt/MSA and for Pt/P-MSA are indicated in Tables 2 and 3, respectively.

TABLE 2

| | |
|---|---|
| Density (g/ml) | 0.7906 |
| Carbon (% w/w) | 84.4 |
| Hydrogen (% w/w) | 14.8 |
| Nitrogen (ppm) | <1 |
| Sulfur (ppm) | 0 |
| Cetane index ASTM D4737 | >80 |
| Mono aromatic compounds (% w/w) | 4.90 |
| Di aromatic compounds (% w/w) | 0.30 |
| Tri aromatic compounds (% w/w) | 0.10 |
| Total aromatic compounds (% w/w) | 5.30 |
| Gasoline in the feedstock (180° C., % w/w) | 8.5 |
| Gas oil in the feedstock (180-380° C., % w/w) | 82 |
| Heavy products in the feedstock (340+° C., % w/w) | 9.5 |
| Heavy products in the feedstock (380+° C., % w/w) | 0 |
| Simulated distillation (ASTM D2887) | |
| Initial point, ° C. | 120 |
| 2%, ° C. | 145 |
| 5%, ° C. | 166 |
| 10%, ° C. | 193 |
| 50%, ° C. | 300 |
| 90%, ° C. | 338 |
| 95%, ° C. | 368 |
| 98%, ° C. | 390 |
| Final point, ° C. | 411 |
| Paraffins distribution (%) | |
| total n-paraffins | 31.07 |
| total iso-paraffins | 68.93 |
| n-paraffins C11– | 4.35 |
| iso-paraffins C11– | 6.39 |
| n-paraffins C12-C20 | 26.18 |

TABLE 3

| | |
|---|---|
| Density (g/ml) | 0.7853 |
| Carbon (% w/w) | 84.99 |
| Hydrogen (% w/w) | 14.96 |
| Nitrogen (ppm) | <1 |
| Sulfur (ppm) | 0 |
| Cetane index ASTM D4737 | >80 |
| Mono aromatic compounds (% w/w) | 2.5 |
| Di aromatic compounds (% w/w) | 0 |
| Tri aromatic compounds (% w/w) | 0 |
| Total aromatic compounds (% w/w) | 2.5 |
| Gasoline in the feedstock (180° C., % w/w) | 8.5 |
| Gas oil in the feedstock (180-380° C., % w/w) | 90 |
| Heavy products in the feedstock (340+° C., % w/w) | 1.5 |
| Heavy products in the feedstock (380+° C., % w/w) | 0 |
| Simulated distillation (ASTM D2887) | |
| Initial point, ° C. | 108 |
| 2%, ° C. | 141 |
| 5%, ° C. | 160 |
| 10%, ° C. | 189 |
| 50%, ° C. | 297 |
| 90%, ° C. | 319 |
| 95%, ° C. | 322 |
| 98%, ° C. | 334 |
| Final point, ° C. | 367 |
| Paraffins distribution (% w/w) | |
| total n-paraffins | 18.07 |
| total iso-paraffins | 81.93 |
| n-paraffins C11– | 2.88 |
| iso-paraffins C11– | 8.70 |
| n-paraffins C12-C20 | 15.18 |
| iso-paraffins C12-C20 | 72.30 |
| n-paraffins C20+ | 0.02 |
| iso-paraffins C20+ | 0.92 |

The hydrocarbon product is then sent to a distillation column in order to separate the gasoline fraction (about 10%) from the diesel fraction (about 90%). The quantity of total aromatic compounds formed (5.3% w/w in the case of the catalyst Pt/MSA, 2.5% w/w in the case of the catalyst Pt/P-MSA) is much lower than that indicated for the processes of the prior art, also in a single step.

EXAMPLE 3

Comparative

Hydrodeoxygenation step (HDO) with $NiMo/Al_2O_3$.

The vegetable oil of Table 1 is fed with hydrogen in equicurrent in the presence of the commercial hydrogenation catalyst UOP UF 210 based on $NiMo/Al_2O_3$ in sulfided form, obtained by the feeding of DMDS (0.025% w)

The reactor is a reactor operating in continuous with a downward flow under the operating conditions specified above.

The effluent product is separated, in a gas/liquid separator, from the gaseous fractions consisting of $H_2$, $CO/CO_2$ and light hydrocarbons almost totally consisting of $C_3H_8$.

After separation of the water, the liquid product proves to consist of n-paraffins, whose characteristics and distribution are indicated in the following Table 4 and in FIG. 2:

TABLE 4

| | |
|---|---|
| Density (g/ml) | 0.7916 |
| Carbon (% w/w) | 84.64 |
| Hydrogen (% w/w) | 14.83 |
| Nitrogen (ppm) | <1 |
| Sulfur (ppm) | 3 |
| Oxygen (by difference, %) | 0.5 |
| $H_2O$ (after anhydrification, ppm) | 100 |
| Mono aromatic compounds (% w/w) | 2.9 |
| Di aromatic compounds (% w/w) | 0.5 |
| Tri aromatic compounds (% w/w) | 0.1 |
| Total aromatic compounds (% w/w) | 3.5 |
| Cloud point | 21 |
| Gasoline in the feedstock (180° C., % w/w) | 0 |
| Gas oil in the feedstock (180-380° C., % w/w) | 96 |
| Heavy products in the feedstock (340+° C., % w/w) | 5 |
| Heavy products in the feedstock (380+° C., % w/w) | 4 |
| Simulated distillation (ASTM D2887) | |
| Initial point, ° C. | 173 |
| 2% | 269 |
| 5% | 272 |
| 10% | 288 |
| 50% | 309 |
| 90% | 324 |
| 95% | 351 |

TABLE 4-continued

| | |
|---|---|
| 98% | 412 |
| Final point, ° C. | 462 |
| Paraffins distribution (% w/w) | |
| total n-paraffins | 90.92 |
| total iso-paraffins | 9.08 |
| n-paraffins C11− | 0.85 |
| iso-paraffins C11− | 0.2 |
| n-paraffins C12-C20 | 87.7 |
| iso-paraffins C12-C20 | 6.5 |
| n-paraffins C20+ | 2.4 |

Figure 2:
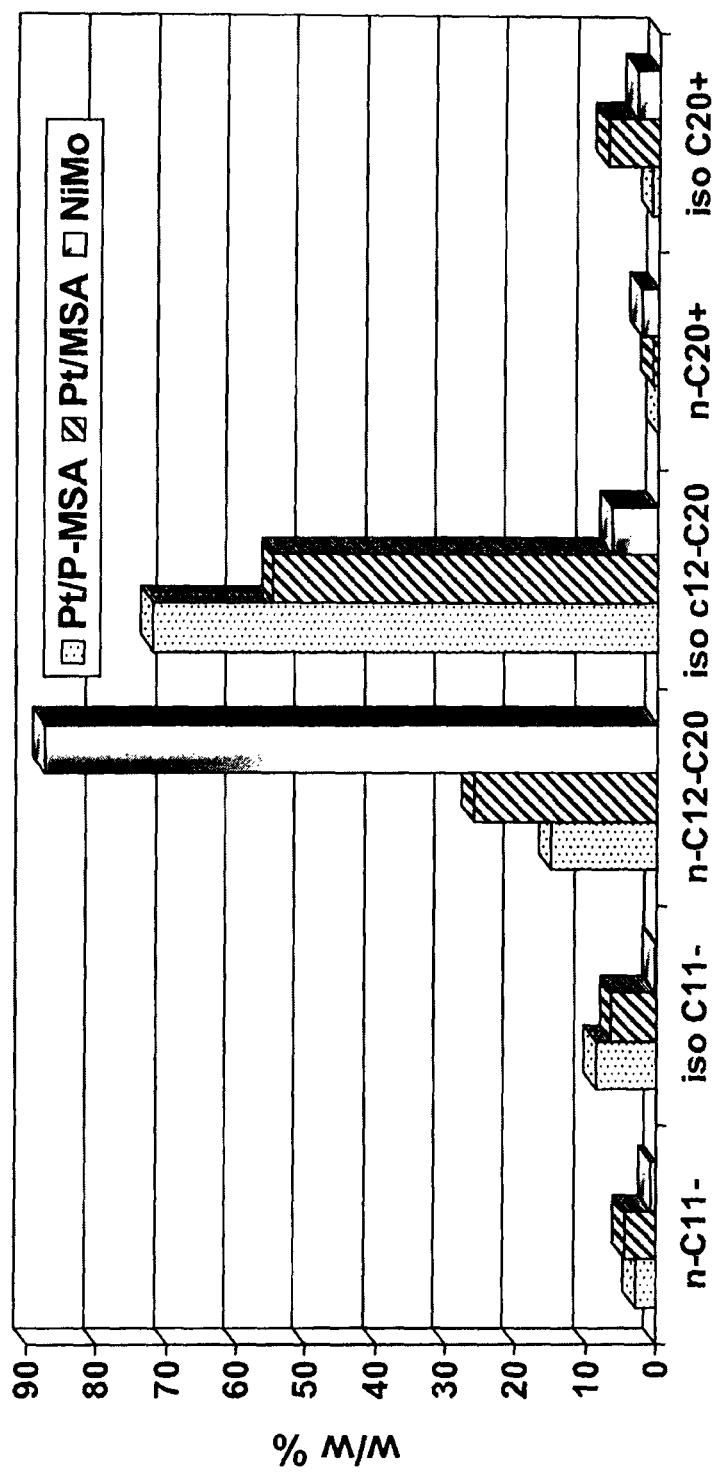
FIG. 2 Liquid products after the removal of water and the catalyst of the present invention.

A comparison of the composition of the liquid fraction for the transformation process of soya oil in a single step with the catalyst of the present invention and with the product obtained in the first step of the process with the material of the known art (NiMo) is indicated in FIG. 2. To enable the HDO product to be used as diesel fraction, the product of the hydrodeoxygenation step must be subjected to hydroisomerization as indicated in the following example.

EXAMPLE 4

Comparative

The vegetable oil of Table 1 is fed with hydrogen in equicurrent in the presence of the commercial catalyst HTC operating under the following conditions:

T (° C.)=315, 343
P (atm)=34.45
LHSV (h$^{-1}$)=1

The reactor is a reactor operating in continuous with a downward flow under the operating conditions specified above. The values relating to the deoxygenation and iso-/n-paraffins ratio at the two temperature values are indicated in Table 5.

EXAMPLE 5

The vegetable oil of Table 1 is fed with hydrogen in equicurrent in the presence of the commercial hydrocracking catalyst DHC-8, having a pore volume of 0.6 g/cm$^3$, containing amorphous silica alumina having a silica/alumina weight ratio=3/1, corresponding to a molar ratio=5.1, in spherical form, impregnated with palladium (1% w/w), operating under the following conditions:

T (° C.)=343, 348
P (atm)=34.45, 68.9
LHSV(h$^{-1}$)=0.5, 0.25
H$_2$/HC=712, 1425 Nl/l The reactor is a reactor operating in continuous with a downward flow under the operating conditions specified above. The values relating to the deoxygenation and iso-/n-paraffins ratio at the two temperature values are indicated in Table 5.

It can be observed that by using a catalyst according to the present invention, a better iso-/n-paraffins ratio is obtained in the resulting product.

TABLE 5

| Catalyst | HTC | HTC | Pd-DHC-8 | Pd-DHC-8 |
|---|---|---|---|---|
| Temperature(° C.) | 314 | 343 | 343 | 348 |
| Pressure (atm) | 34.45 | 34.45 | 34.45 | 68.9 |
| LHSV (h$^{-1}$) | 1.0 | 1.0 | 0.5 | 0.25 |
| Deoxygenation (%) | >98 | >98 | 75 | 94 |
| i/n-paraffins | 0.03 | 0.06 | 2.5 | 2.1 |

EXAMPLE 6

Comparative

Hydroisomerization Step

The product obtained in the deoxygenation step described in example 3, containing 100 ppm of residual H$_2$O, is treated in equicurrent with hydrogen in the presence of the Pt/MSA catalyst prepared in the previous example 1. The operating conditions used are indicated in Table 6

TABLE 6

| | |
|---|---|
| Temperature | 340-360° C. |
| LHSV | 2 hours$^{-1}$ |
| Pressure | 35 bar |
| H$_2$/HC | 1,000 Nl/l |

The effluent product from the hydroisomerization reactor consists of a gaseous phase and a liquid phase, the two phases are separated in a gas/liquid separator, the gaseous phase analyzed via GC consists of C$_3$/C$_4$ light paraffins (LPG), whereas the liquid phase separated, containing paraffins with a number of carbon atoms ranging from 5 to 22, is analyzed by means of GC to evaluate the isomerization degree, which, under these operating conditions is 80%.

The hydrocarbon product is then sent to a distillation column in order to separate the gasoline fraction (12.7%) from the diesel fraction (87.3%). This latter fraction, containing paraffins with a number of carbon atoms ranging from 12 to 22, was characterized and the main properties are indicated in Table 7 below:

TABLE 7

| Density, g/cm$^3$ | ASTM D 4052-96 | 0.785 |
|---|---|---|
| Sulphur, ppm | ISO 20846 | 0 |
| Cloud point, ° C. | ASTM D2500-05 | −12 |
| Cetane number | ENI ISO 5165 | >76 |
| Total aromatic compounds % w/w | | <1 |
| Iso paraffins, % w/w | | 80 |
| n-paraffins, % w/w | | 20 |
| Simulated distillation (ASTM D2887) | | |
| 5%, ° C. | | 225 |
| 10%, ° C. | | 262 |
| 50%, ° C. | | 301 |
| 90%, ° C. | | 317 |
| 95%, ° C. | | 322 |

The quality of the product obtained through the two-step process with two different catalysts is absolutely comparable with the quality obtained with the single-step process, object of the present invention.

The invention claimed is:

1. A process for producing a hydrocarbon fraction, comprising:
    hydrotreating a mixture of biological origin comprising esters of fatty acids and, optionally, free fatty acids, in the presence of a catalytic composition comprising:
    A) an amorphous support of acidic nature selected from the group consisting of:

(1) an amorphous silica-alumina having a $SiO_2/Al_2O_3$ molar ratio greater or equal to 5, and
(2) a porous solid material comprising silicon, aluminum, phosphorus and oxygen bonded together so as to form an amorphous mixed oxide constituting a single phase, having a Si/Al atomic ratio of from 15 to 250, a P/Al ratio of from 0.1 to 5, a total pore volume of from 0.5 to 2.0 ml/g, an average pore diameter of from 3 nm to 40 nm and a specific surface area of from 200 to 1,000; and B) a metallic component comprising at least one metal of group VIII, optionally, in admixture with at least one metal of group VIB, wherein the catalytic composition, when formed by the amorphous silica-alumina (1) and Pt, is pretreated with a hydrocarbon comprising from 7 to 16 carbon atoms, when the amorphous silica-alumina (1) is a completely amorphous, micro-mesoporous silica-alumina (1a) having a $SiO_2/Al_2O_3$ molar ratio of from 30 to 500, a surface area greater than 500 $m^2/g$, a pore volume of from 0.3 to 1.3 ml/g, and an average pore diameter smaller than 40 Å, and wherein, in the hydrotreating, hydrogenation, deoxygenation, and isomerization of the mixture of biological origin is conducted contemporaneous in one step.

2. The process according to claim 1,
wherein the amorphous support of acidic nature (A) is selected from the group consisting of:
(1a) a completely amorphous, micro-mesoporous silica-alumina (1a) having a $SiO_2/Al_2O_3$ molar ratio of from 30 to 500, a surface area greater than 500 $m^2/g$, a pore volume of from 0.3 to 1.3 ml/g, an average pore diameter smaller than 40 Å, and
(2) a porous solid material comprising silicon, aluminum, phosphorus and oxygen bonded together so as to form an amorphous mixed oxide constituting a single phase, having a Si/Al atomic ratio of from 15 to 250, a P/Al ratio of from 0.1 to 5, a total pore volume of from 0.5 to 2.0 ml/g, an average pore diameter of from 3 nm to 40 nm and a specific surface area of from 200 to 1,000;

B) a metallic component comprising at least one metal s of the group VIII, optionally, in admixture with at least one metal of group VIB, wherein the catalytic composition, when formed by the completely amorphous, micro-mesoporous silica-alumina (1a) and Pt, is pretreated with a hydrocarbon comprising from 7 to 16 carbon atoms, wherein, in the hydrotreating, hydrogenation, deoxygenation, and isomerization of the mixture of biological origin is conducted contemporaneous in one step.

3. The process according to claim 1, wherein the mixture of biological origin is a mixture of vegetable or animal origin.

4. The process according to claim 1, wherein the esters of fatty acids are triglycerides of fatty acids, in which the hydrocarbon chain of the fatty acid comprises from 12 to 24 carbon atoms and is monounsaturated or polyunsaturated.

5. The process according to claim 1, wherein the mixture of biological origin is vegetable oil, vegetable fat, animal fat, fish oil or a mixture thereof.

6. The process according to claim 5, wherein said vegetable oil and vegetable fat are at least one selected from the group consisting of sunflower, rape, canola, palm, soybean, hemp, olive, linseed, mustard, peanut, castor, and coconut oil, fatty oil comprised in pine tree pulp, recycle oil and fat from food industry, and said animal oil or fat is at least one selected from the group consisting of bacon-fat, lard, tallow, milk fat, recycle oil from food industry, and recycle fat from food industry.

7. The process according to claim 1, wherein said mixture of biological origin is admixed with at least one hydrocarbon prior to the hydrotreating.

8. The process according to claim 1, wherein the catalyst composition comprises said silica-alumina (1a) having a $SiO_2/Al_2O_3$ molar ratio of from 50 to 300.

9. The process according to claim 1, wherein the catalyst composition comprises said silica-alumina (1a) having a porosity of from 0.3 to 0.6 ml/g.

10. The process according to claim 1, wherein the catalyst composition comprises said porous solid material (2) having a surface area of from 300 to 900 $m^2/g$.

11. The process according to claim 10, wherein said surface area is from 400 to 800 $m^2/g$.

12. The process according to claim 1, wherein the catalyst composition comprises said porous solid material (2) having an average pore diameter of from 5 to 30 nm.

13. The process according to claim 12, wherein the pore average diameter is from 6 to 25 nm.

14. The process according to claim 1, wherein the catalyst composition comprises said porous solid material (2) having a porosity of from 0.7 to 1.7 ml/g.

15. The process according to claim 1, wherein the catalyst composition comprises said porous solid material (2) having the P/Al ratio of from 0.3 to 3.5.

16. The process according to claim 15, wherein the P/Al ratio is from 0.5 to 2.5.

17. The process according to claim 1, wherein the catalyst composition comprises said porous solid material (2) having the Si/Al atomic ratio of of from 20 to 200.

18. The process according to claim 17, wherein the Si/Al atomic ratio is from 25 to 150.

19. The process according to claim 1, wherein the catalyst composition comprises the amorphous silica-alumina which is an extruded material comprising a binder.

20. The process according to claim 1, wherein the catalyst composition comprises said amorphous silica-alumina (1a), in the form of an extruded material comprising a binder, and which is prepared by a method comprising:
(a) forming an aqueous solution of tetralkylammonium hydroxide (TAA-OH), a soluble aluminum compound capable of hydrolysing in $Al_2O_3$ and a silicon compound capable of hydrolysing in $SiO_2$, in the following mutual molar ratios:
$SiO_2/Al_2O_3$ from 30/1 to 500/1,
$TAA-OH/SiO_2$ from 0.05/1 to 0.2/1, and
$H_2O/SiO_2$ from 5/1 to 40/1,
(b) heating the aqueous solution to cause hydrolysis and gelification thereof, thus obtaining a first mixture having a viscosity of from 0.01 to 100 Pa s;
(c) bringing the first mixture into contact with a binder belonging to the bohemite or pseudobohemite class, in a weight ratio with said first mixture of from 0.05 to 0.5, and then with a mineral or organic acid in an amount of from 0.5 to 8.0 g per 100 g of binder, to produce a second mixture;
(d) heating the second mixture while mixing, up to a temperature from 40 to 90° C., until a homogenous paste is obtained that undergoes extrusion and granulation, thereby obtaining an extruded product; and
(e) drying and calcining the extruded product in an oxidizing atmosphere.

21. The process according to claim 20, wherein a compound comprising phosphorous is added in (c).

22. The process according to claim 1, wherein the catalyst composition comprises said porous solid material (2) which is bound with inert components.

23. The process according to claim 22, wherein said porous solid material (2) in the bound form is prepared by a process comprising: admixing a gel obtained by hydrolyzing and gelifying an aqueous mixture of Al alkoxide, tetralkyl silicate, tetralkylammonium hydroxide and oxygenated phosphorus compound with an inorganic binder, an acidifying compound and possibly optionally a plastifying agent.

24. The process according to claim 1, wherein the catalytic composition comprises at least one metal of group VIII, selected from the group consisting of Pt, Pd, Ni, and Co as the metal component (B).

25. The process according to claim 24, wherein the catalytic system comprises only metals of group VIII.

26. The process according to claim 24, wherein the catalytic system comprises as the metal component (B) both the at least one metal of group VIII and the at least one metal of group VIB, wherein the at least one metal of group VIB is Mo, W, or a mixture thereof.

27. The process according to claim 24, wherein the catalytic system comprises both at least one metal of group VIII and at least one metal of group VIB, wherein said at least one metal of group VIII is Ni, Co, or a combination thereof.

28. The process according to claim 27, wherein the catalytic system comprises as the metal component (B) both the at least one metal of group VIII and the at least one metal of group VIB, wherein the at least one metal of group VIB is Mo, W, or a mixture thereof.

29. The process according to claim 1, wherein the catalytic system comprises as the metal component (b) both at least one metal of group VIII and at least one metal of group VIB, wherein the at least one metal of group VIB is Mo, W, or a combination thereof.

30. The process according to claim 1, wherein the catalytic composition comprises from 0.1 to 5% by weight of the at least one metal of group VIII with respect to the total weight of the composition formed by the components A and B.

31. The process according to claim 1, wherein the catalytic composition comprises from 1 and 50% by weight the at least one metal of group VIB with respect to the total weight of the composition formed by the components A and B.

32. The process according to claim 31, wherein the catalytic composition comprises from 5 and 35% by weight of the at least one metal of group VIB with respect to the total weight of the composition formed by the components A and B.

33. The process according to claim 1, wherein the catalytic component comprises the at least one metal of group VIII and a silica alumina gel support, which is amorphous to X-rays, having a $SiO_2/Al_2O_3$ molar ratio of from 30 to 500, a surface area of from 500 to 1,000 $m^2/g$, a pore volume 0.3 to 0.6 ml/g and an average pore diameter of from 10 to 30 Å.

34. The process according to claim 1, wherein the catalytic composition comprises the at least one metal of group VIII and a calcined silica alumina gel support, which is amorphous to X-rays, having a $SiO_2/Al_2O_3$ molar ratio of from 30 to 500, a surface area of from 500 to 1,000 $m^2/g$, a pore volume up to 0.8 ml/g and an average pore diameter of from 10 to 40 Å.

35. The process according to claim 1, wherein the catalytic composition comprises at least one metal selected from the group consisting of Pt, Pd, Ir, Ru, Rh and Re and the amorphous silica-alumina support, which is amorphous to X-rays, having a $SiO_2/Al_2O_3$ molar ratio of from 30 to 500, a surface area greater than 500 $m^2/g$, a pore volume of from 0.3 to 1.3 ml/g and an average pore diameter smaller than 40 Å.

36. The process according to claim 1, wherein the catalytic composition comprises a mixture of metals belonging to groups VIB and VIII and the amorphous silica alumina gel support, which is amorphous to X-rays, having a $SiO_2/Al_2O_3$ molar ratio of from 30 to d 500, a surface area of from 500 to 1,000 $m^2/g$, a pore volume comprised of from 0.3 to 0.6 ml/g and an average pore diameter of from 10 to 40 Å.

37. The process according to claim 1, carried out in a hydrotreating fixed bed reactor.

38. The process according to claim 37, wherein the mixture is fed to the reactor co-currently with or countercurrently to hydrogen.

39. The process according to claim 37, wherein the reactor comprises 2 or more adiabatic catalytic beds.

40. The process according to claim 39, wherein the mixture is fed to the reactor co-currently with or countercurrently to hydrogen.

41. The process according to claim 1, wherein the mixture is fed to the reactor co-currently with or countercurrently to hydrogen.

42. The process according to claim 1, carried out at a pressure of from 25 to 70 bars, and at a temperature of from 250 to 480° C.

43. The process according to claim 42, carried out at a pressure of from 30 to 50 bars, and at a temperature of from 280 to 450° C.

44. The process according to claims 42 carried out at a LHSV of from 0.5 to 2 $hours^{-1}$.

45. The process according to claim 1, wherein a ratio of $H_2$/the mixture of biological origin is from 400 to 2000 Nl/l.

46. The process according to claim 1, wherein the catalytic composition is formed by Pt and the amorphous silica-alumina (1) and the pretreatment is carried out at a temperature of from 100° C. to 500° C.

47. The process according to claim 46, wherein the amorphous silica-alumina is of the completely amorphous, micro-mesoporous silica-alumina (1a).

48. The process according to claim 1, wherein the catalytic composition is formed by the amorphous silica-alumina (1), Pt and a binder and undergoes the pretreatment with a hydrocarbon comprising from 7 to 16 carbon atoms.

49. The process according to claim 46, wherein the pretreatment is carried out at a temperature of from 200 to 400° C.

50. The process according to claim 46, carried out at a pressure of from 5 to 50 bars.

51. The process according to claim 46, wherein the pretreatment is carried out in the same reactor, where the production process of the hydrocarbon fraction takes place.

52. The process according to claim 48, wherein the pretreatment is carried out at a temperature of from 100° C. to 500° C.

53. The process according to claim 48, wherein the amorphous silica-alumina is the completely amorphous, micro-mesoporous silica-alumina (1a).

54. The process according to claim 1, wherein the catalytic composition, optionally in the bound form with a binder, is pretreated with a hydrocarbon comprising from 7 to 16 carbon atoms.

55. The process according to claim 54, wherein the pretreatment is carried out at a temperature of from 100° C. to 500° C.

56. The process according to claim 54, wherein the pretreatment is carried out in the same reactor, where the production process of the hydrocarbon fraction takes place.

57. The process according to claim 1, wherein the pretreatment is carried out in the same reactor, where the production process of the hydrocarbon fraction takes place.

58. A process for producing a hydrocarbon fraction, comprising:
hydrotreating a mixture of biological origin comprising esters of fatty acids and, optionally, free fatty acids, in the presence of a catalytic composition comprising:
A) an amorphous support of acidic nature selected from the group consisting of:
(1) an amorphous silica-alumina having a $SiO_2/Al_2O_3$ molar ratio greater or equal to 5, and
(2) a porous solid material comprising silicon, aluminum, phosphorus and oxygen bonded together so as to form an amorphous mixed oxide constituting a single phase, having a Si/Al atomic ratio of from 15 to 250, a P/Al ratio of from 0.1 to 5, a total pore volume of from 0.5 to 2.0 ml/g, an average pore diameter of from 3 nm to 40 nm and a specific surface area of from 200 to 1,000; and
B) a metallic component comprising at least one metal of group VIII, optionally, in admixture with at least one metal of group VIB,
wherein the catalytic composition, when formed by the amorphous silica-alumina (1) and Pt, is pretreated with a hydrocarbon comprising from 7 to 16 carbon atoms,
wherein, in the hydrotreating, hydrogenation, deoxygenation, and isomerization of the mixture of biological origin is conducted contemporaneous in one step.

59. A treatment process comprising treating a catalytic composition with a hydrocarbon comprising from 7 to 16 carbon atoms, wherein said catalytic composition comprises:
A) an amorphous support of acidic nature selected from the group consisting of:
(1) an amorphous silica-alumina having a $SiO_2/Al_2O_3$ molar ratio greater or equal to 5, and
(2) a porous solid material comprising silicon, aluminum, phosphorus and oxygen bonded together so as to form an amorphous mixed oxide constituting a single phase, having a Si/Al atomic ratio of from 15 to 250, a P/Al ratio of from 0.1 to 5, a total pore volume of from 0.5 to 2.0 ml/g, an average pore diameter of from 3 nm to 40 nm and a specific surface area of from 200 to 1,000;
B) a metallic component comprising at least one metal of group VIII, optionally in admixture with at least one metal of group VIB.

60. The treatment process according to claim 59, wherein the catalytic compositions comprises:
A) an amorphous support of acidic nature selected from the group consisting of:
(1) a completely amorphous, micro-mesoporous silica-alumina (1a) having a $SiO_2/Al_2O_3$ molar ratio of from 30 to 500, a surface area greater than 500 $m^2/g$, a pore volume of from 0.3 to 1.3 ml/g, an average pore diameter smaller than 40 Å, and
(2) a porous solid material comprising silicon, aluminum, phosphorus and oxygen bonded together so as to form an amorphous mixed oxide constituting a single phase, having a Si/Al atomic ratio of from 15 to 250, a P/Al ratio of from 0.1 to 5, a total pore volume of from 0.5 to 2.0 ml/g, an average pore diameter of from 3 nm to 40 nm and a specific surface area of from 200 to 1,000; and
B) a metallic component comprising at least one metal of the group VIII, optionally in admixture with at least one metal of group VIB.

61. The treatment process according to claim 59, wherein said process is carried out a temperature of from 100 to 500° C.

62. An acidic material in extruded form, comprising an inorganic inert binder, an amorphous silica-alumina and a phosphorus compound, wherein said acidic material is obtained by a process comprising:
(a) forming an aqueous solution of tetralkylammonium hydroxide (TAA-OH), a soluble aluminum compound capable of hydrolysing in $Al_2O_3$ and a silicon compound capable of hydrolysing in $SiO_2$, in the following mutual molar ratios:
$SiO_2/Al_2O_3$ from 30/1 to 500/1,
$TAA-OH/SiO_2$ from 0.05/1 to 0.2/1, and
$H_2O/SiO_2$ from 5/1 to 40/1,
(b) heating the aqueous solution to cause hydrolysis and gelification thereof thus obtaining a first mixture having a viscosity of from 0.01 to 100 Pa s;
(c) bringing into contact the first mixture first with a binder belonging to the bohemite or pseudobohemite class, wherein a weight ratio of the binder to said mixture is from 0.05 to 0.5, and then second with 0.5 and 8.0 g of a mineral or organic acid per 100 g of the binder and with the phosphorous compound to produce a second mixture;
(d) heating under mixing the second mixture up to a temperature of from 40 to 90° C., until a homogenous paste is obtained that undergoes extrusion and granulation, thereby producing an extruded product; and
(e) drying and calcining the extruded product under an oxidizing atmosphere.

* * * * *